(12) United States Patent
Shahana

(10) Patent No.: US 7,125,354 B2
(45) Date of Patent: Oct. 24, 2006

(54) BICYCLE DERAILLEUR WITH A CHAIN GUIDE DISPOSED AT AN UPPER PORTION OF A LINK MECHANISM

(75) Inventor: Satoshi Shahana, Osaka (JP)

(73) Assignee: Shimano, Inc., Sakai (JP)

( * ) Notice: Subject to any disclaimer, the term of this patent is extended or adjusted under 35 U.S.C. 154(b) by 261 days.

(21) Appl. No.: 10/604,379

(22) Filed: Jul. 15, 2003

(65) Prior Publication Data

US 2004/0110588 A1 Jun. 10, 2004

(30) Foreign Application Priority Data

Jul. 31, 2002 (JP) .............................. 2002-224094

(51) Int. Cl.
*F16H 9/00* (2006.01)
*B62M 9/12* (2006.01)

(52) U.S. Cl. .......................................... 474/82; 474/80

(58) Field of Classification Search ............ 474/78–82; D12/124
See application file for complete search history.

(56) References Cited

U.S. PATENT DOCUMENTS

| | | | |
|---|---|---|---|
| 3,803,933 A | 4/1974 | Huret et al. | |
| 3,903,751 A | 9/1975 | Dian | |
| 3,927,904 A | 12/1975 | Bergles | |
| 4,183,255 A * | 1/1980 | Leiter | 474/82 |
| 4,277,077 A * | 7/1981 | Ozaki | 474/80 |
| 4,637,808 A * | 1/1987 | Nakamura | 474/80 |
| 4,789,379 A | 12/1988 | Ozaki et al. | |
| 5,312,301 A * | 5/1994 | Kobayashi | 474/82 |
| 5,397,273 A * | 3/1995 | Ando | 474/82 |
| 5,466,194 A * | 11/1995 | Steinberg et al. | 474/80 |
| 5,533,937 A * | 7/1996 | Patterson et al. | 474/80 |
| 5,597,366 A * | 1/1997 | Ozaki | 474/82 |
| D424,984 S * | 5/2000 | Hanamura | D12/124 |

FOREIGN PATENT DOCUMENTS

| | | | | |
|---|---|---|---|---|
| CH | 337740 | * | 5/1999 | .................. 474/82 |
| DE | 2240896 | | 3/1973 | |
| EP | 0657345 A1 | * | 6/1995 | .................. 474/82 |
| EP | 657346 A2 | | 6/1995 | |
| FR | 1204027 | * | 1/1960 | .................. 474/82 |
| FR | 2759968 A1 | * | 8/1998 | .................. 474/82 |
| JP | 63-11494 A | | 1/1988 | |
| JP | 1-136888 | | 5/1989 | |
| JP | 07-156855 A | | 6/1995 | |
| JP | 10-16865 | | 1/1998 | |
| JP | 11-263282 A | | 9/1999 | |

* cited by examiner

*Primary Examiner*—Marcus Charles
(74) *Attorney, Agent, or Firm*—James A. Deland

(57) ABSTRACT

A bicycle derailleur comprises a base member structured to be mounted to a bicycle frame; a link mechanism having a first portion and a second portion, wherein the first portion of the link mechanism is coupled to the base member, and wherein the second portion of the link mechanism is disposed above the first portion of the link mechanism; and a chain guide coupled to the second portion of the link mechanism so that the chain guide moves relative to the base member to move a chain among a plurality of sprockets.

20 Claims, 5 Drawing Sheets

US 7,125,354 B2

BICYCLE DERAILLEUR WITH A CHAIN GUIDE DISPOSED AT AN UPPER PORTION OF A LINK MECHANISM

BACKGROUND OF INVENTION

The present invention is directed to bicycles and, more particularly, to a derailleur used to shift a chain among a plurality of sprockets.

Bicycles are used both for general transportation as well as many recreational activities. Sometimes the bicycle is transported to locations away from home before being ridden. As a result, in recent years bicycles have been developed to make them more compact to facilitate transportation and ease of use, for example, but without losing functionality expected of bicycles. This includes the development of bicycles that have smaller wheels than those found on conventional bicycles.

Many bicycles currently available have multiple speed transmissions that allow the rider to select gear ratios to accommodate changes in running conditions. Such transmissions sometimes include a derailleur for transferring a chain among a plurality of sprockets. For example, a rear derailleur may be detachably fixed to the back end of the bicycle frame, wherein the rear derailleur engages a chain on any one of a plurality of sprockets that are rotatably mounted on the rear wheel hub. One such derailleur is disclosed in Japanese Unexamined Patent Application Number 8-188852. The rear derailleur taught in that publication comprises a base member disposed on a rear end of the bicycle frame, a four-point link mechanism disposed on the base member, and a chain guide disposed on the four-point link mechanism. When this rear derailleur is operated, the four-point link mechanism moves the chain guide laterally onto any one of a plurality of sprockets mounted to the rear wheel axle.

When a conventional derailleur is mounted on a small-wheeled bicycle, there is a risk that the rear derailleur may come into contact with the road surface when the bicycle is inclined either when the bicycle is stopped or during riding. While this does not pose a problem in terms of rear derailleur function, the surface of the rear derailleur may become damaged and the appearance of the rear derailleur suffers.

SUMMARY OF INVENTION

The present invention is directed to various features of a derailleur. In one embodiment, a bicycle derailleur comprises a base member structured to be mounted to a bicycle frame; a link mechanism having a first portion and a second portion, wherein the first portion of the link mechanism is coupled to the base member, and wherein the second portion of the link mechanism is disposed above the first portion of the link mechanism; and a chain guide coupled to the second portion of the link mechanism so that the chain guide moves relative to the base member to move a chain among a plurality of sprockets. Additional inventive features will become apparent from the description below, and such features alone or in combination with the above features may form the basis of further inventions as recited in the claims and their equivalents.

DETAILED DESCRIPTION

Figure 1:
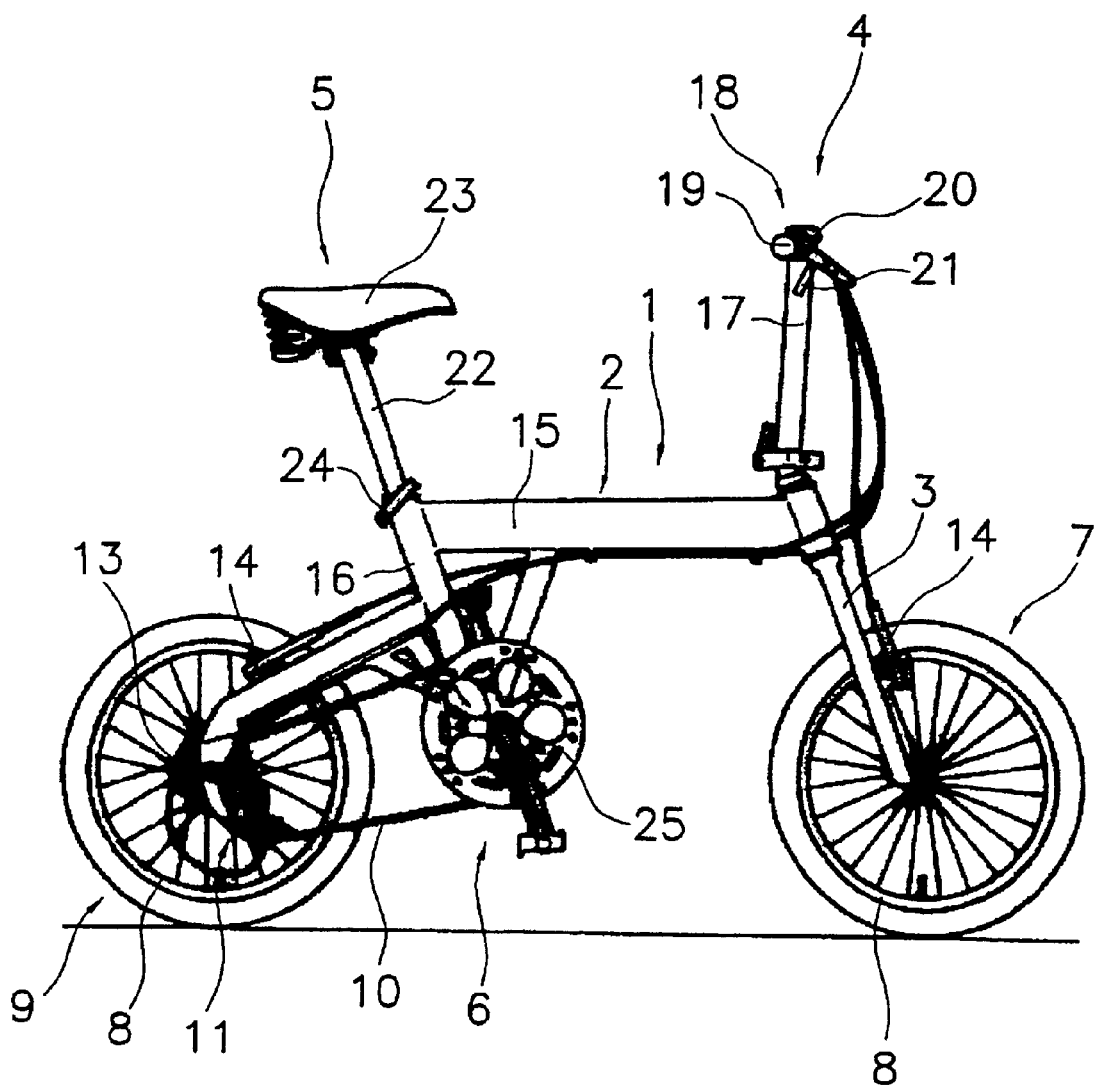
FIG. 1 is a side view of a particular embodiment of a bicycle equipped with a derailleur.

FIG. 1 is a side view of a particular embodiment of a small-wheeled bicycle 1 equipped with a derailleur. The small-wheeled bicycle comprises a frame body 2 and a front fork 3; a handlebar assembly 4; a saddle assembly 5; a drive assembly 6; a front wheel 7 assembly and a rear wheel assembly 9 having small wheels 8; a chain 10; a rear derailleur 11 that shifts the chain 10 onto any one of a plurality of sprockets 13 that form a part of rear wheel assembly 9; and front and rear brakes 14.

Frame body 2 has a horizontal tube 15, wherein front fork 3 is mounted to the front of horizontal tube 15 for rotation around an axis inclined diagonally forward. Handlebar assembly 4 is mounted to the upper portion of front fork 3, and front wheel assembly 7 is rotatably mounted to the lower portion of front fork 3 through a hub axle. Handlebar assembly 4 comprises a handlebar stem 17 mounted to the upper portion of front fork 3 and a handlebar 18 mounted to the upper end of handlebar stem 17. Handlebar 18 is provided with a grip 19, a gearshift control assembly 20, and a brake control assembly 21.

A seat tube 16 is mounted to the rear of horizontal tube 15, wherein saddle assembly 5 is mounted to the upper portion of seat tube 16 and drive assembly 6 is mounted to the lower portion of seat tube. Saddle assembly 5 comprises a seat post 22 and a saddle 23, wherein seat post 22 is inserted into the upper portion seat tube 16. By rotating a seat pin 24 attached to the upper end of seat tube 16, seat post 22 can be fastened to or released from the seat tube. Drive assembly 6 comprises a gear crank 25 disposed in the lower portion (bottom bracket portion) of frame body 2 and a chain 10 engaged on any one of a plurality of sprockets of gear crank 25. Rear wheel 9 is rotatably mounted to the back end of frame body 2 through a hub axle 40 (FIG. 2).

Figure 2:
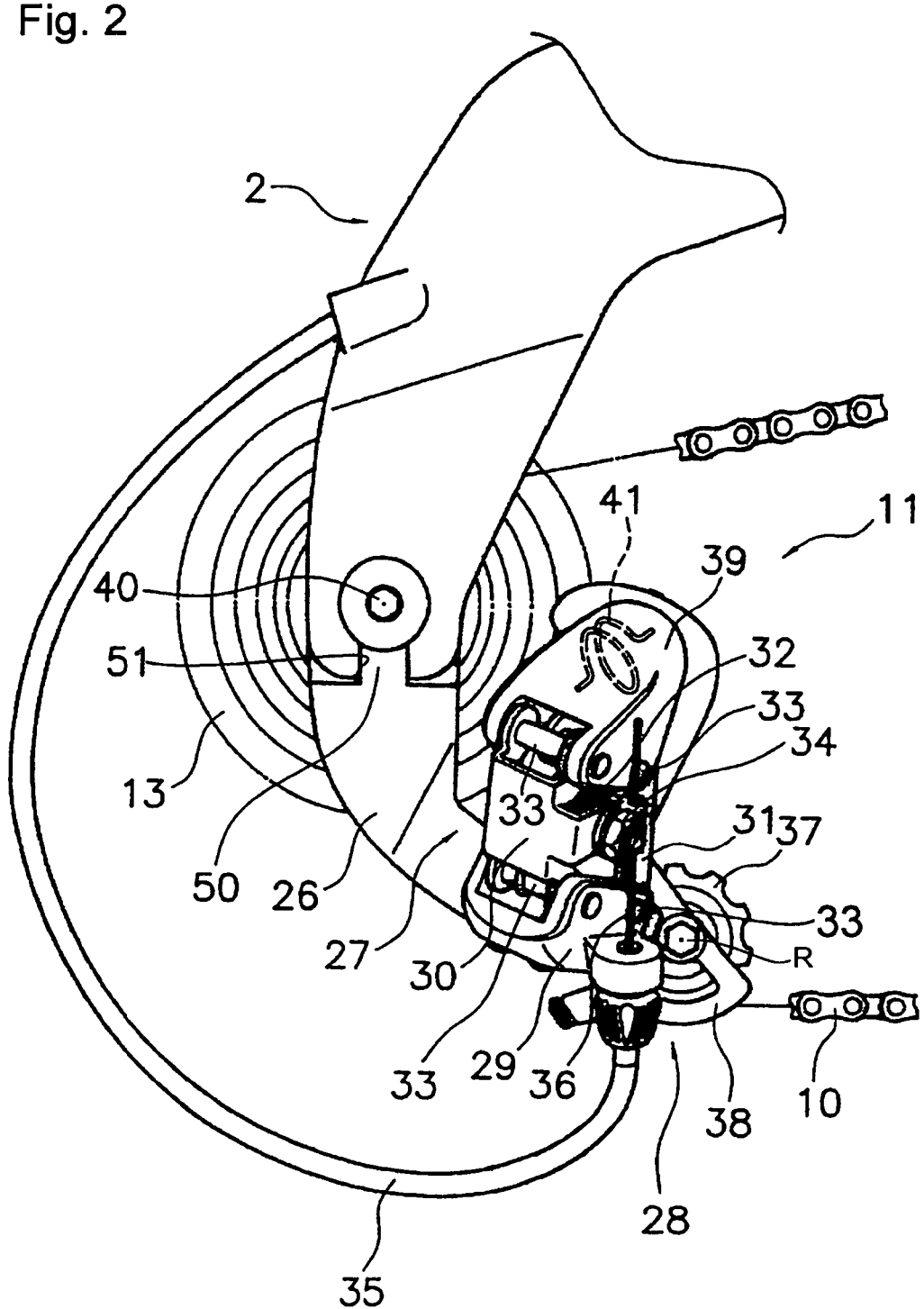
FIG. 2 is a side view of a particular embodiment of a rear derailleur.
Figure 3:
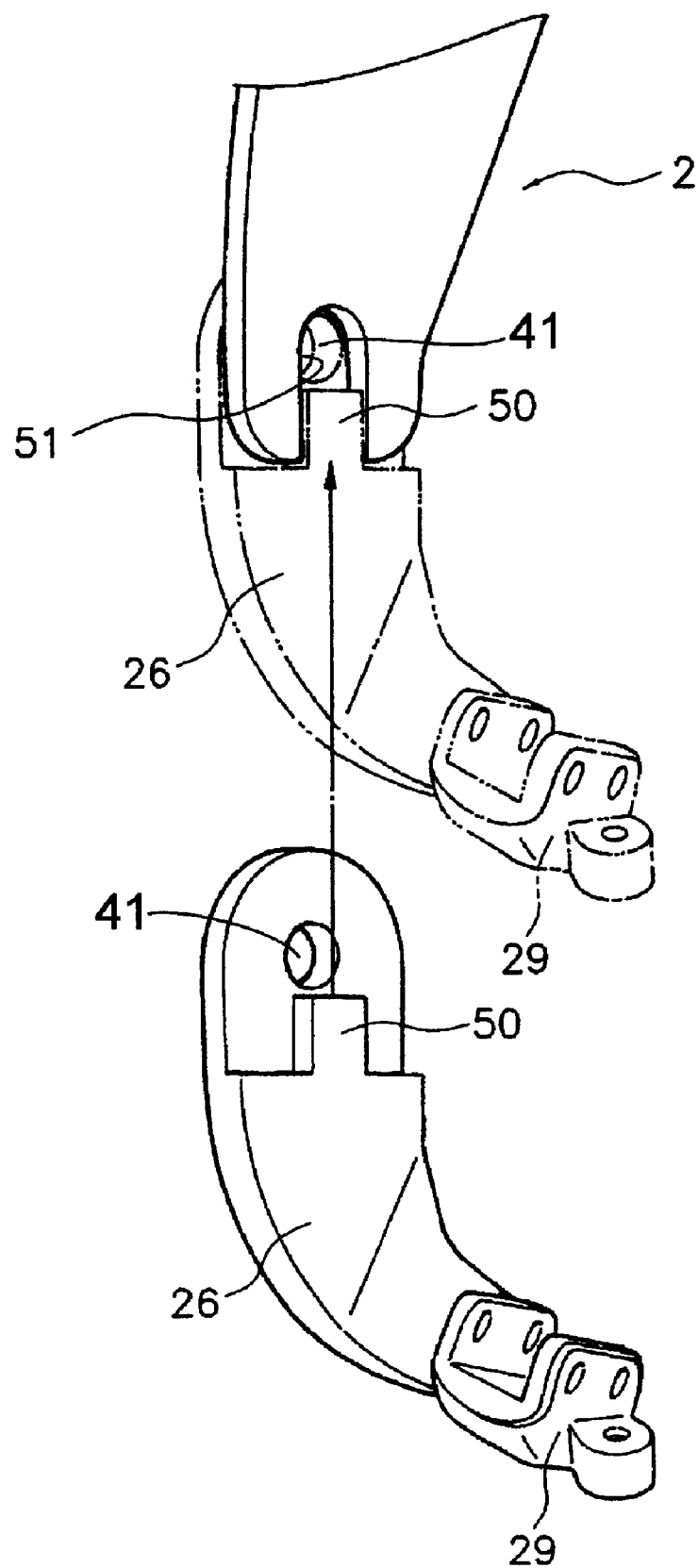
FIG. 3 shows how the base member of the derailleur shown in FIG. 2 is attached to the bicycle frame.

FIG. 2 is a side view of a particular embodiment of rear derailleur 11. Rear derailleur 11 comprises a base member 26, a four-point link mechanism 27 disposed on base member 26, and a chain guide 28 disposed on four-point link mechanism 27. As shown in FIGS. 2 and 3, base member 26 and hub axle 40 are affixed to the back end of frame body 2. More specifically, the back end of frame body 2 has a recessed slit 51, and base member 26 has an axle opening 41 and a convex projection 50. Convex projection 50 is pushed upwardly into recessed slit 51, and hub axle 40 is passed through axle opening 41 and secured to nonrotatably interlock base member 26, and hence rear derailleur 11, to frame body 2.

The four-point link mechanism 27 comprises a first link member 30 and second link member 31 rotatably mounted through pivot shafts 33 to a link base 29 disposed at the bottom end of base member 26, and a linking member 39. Linking member 39 is rotatably mounted to upwardly extending distal ends of the first and second link members 30 and 31 through pivot shafts 33, and a chain guide 28 is rotatably mounted to linking member 39. A first biasing member 32 is connected to diagonally opposite pivot shafts 33 so that chain guide 28 is biased laterally outwardly, and cable retaining unit 34 is disposed on a side face of second link member 31 for retaining an inner cable 36 of a control cable assembly 35. Chain guide 28 comprises a pair of guide sprockets 37 (only the lower guide sprocket 37 is shown in the drawing) and a guide frame 38 for supporting each guide sprocket 37 for rotation around a rotational axis R. Guide frame 38 is mounted on linking member 39 for rotation in a plane perpendicular to the linking member 39 axis, and it is rotationally biased by a second biasing member 42 to impart tension to chain 10 (i.e., in a clockwise direction in FIG. 2).

During operation, the four point link mechanism 27 moves such that link members 30 and 31 rotate about the pivot shafts 33. Also, movement takes place such that, in the plane perpendicular to the four pivot shafts 33, line segments connecting the pivot shafts 33 are maintained parallel to one another and form a parallelogram. In this embodiment, such lines form a parallelogram when the derailleur is in the initial state. As the derailleur moves from the initial state toward the end of its range of motion, the parallelogram transforms into a rectangle and then back into a parallelogram. As a result, the displacement of the chain guide in a direction perpendicular to the line connecting the pivots shafts 33 at the link base 29 is less than derailleurs that have such lines in the shape of a rectangle in the initial state, the lowermost edge of the chain guide is higher throughout the range of motion, and the risk of contact between the derailleur and the ground is minimized.

When riding bicycle 1, gearshift control assembly 20 is operated to select a desired gear ratio in response to a change in riding conditions. The gearshift operation may be transmitted to the derailleur 11 by the control cable assembly 35. More specifically, the inner cable 36 of control cable assembly 35 is pulled and released, and this motion is transmitted to second link member 31 by the cable retaining unit 34. The first link member 30 and second link member 31 pivot around their respective pivot shafts 33 in accordance with the forces of first biasing member 32 and inner cable 36, chain guide 28 moves laterally inwardly and outwardly in the direction of the hub axle 40, and the chain 10 engaged on the guide sprockets 37 rotatably supported by the guide frame 38 is guided onto one of the plurality of sprockets 13.

In order for the complex functions of rear derailleur 11 to be advantageously realized in a small-wheeled bicycle, it is necessary to avoid contact between derailleur 11 and the road surface while maintaining a highly rigid linkage between the rear derailleur 11 and frame body 2, not only when the bicycle is stopped, but also when the bicycle body is inclined during riding. In the rear derailleur 11 of the present embodiment, the convex projection 50 formed on the upper portion of the base member 26 and the concave slit 51 formed on the back end of the frame 2 provides a highly rigid nonrotatable linkage between the rear derailleur 11 and the frame body 2. Additionally, since the portion of the four-point link mechanism 27 to which the chain guide 28 and the linking member 39 are mounted is positioned above the portion of the four-point link mechanism 27 mounted to the base member 26, the chain guide 28 is disposed forward and upwardly of the base member. Thus, the rear derailleur 11 is located further above the road surface than conventional derailleurs, so there is sufficient distance to avoid contact between the rear derailleur 11 and the road surface even if the bicycle body inclines.

Figure 4:
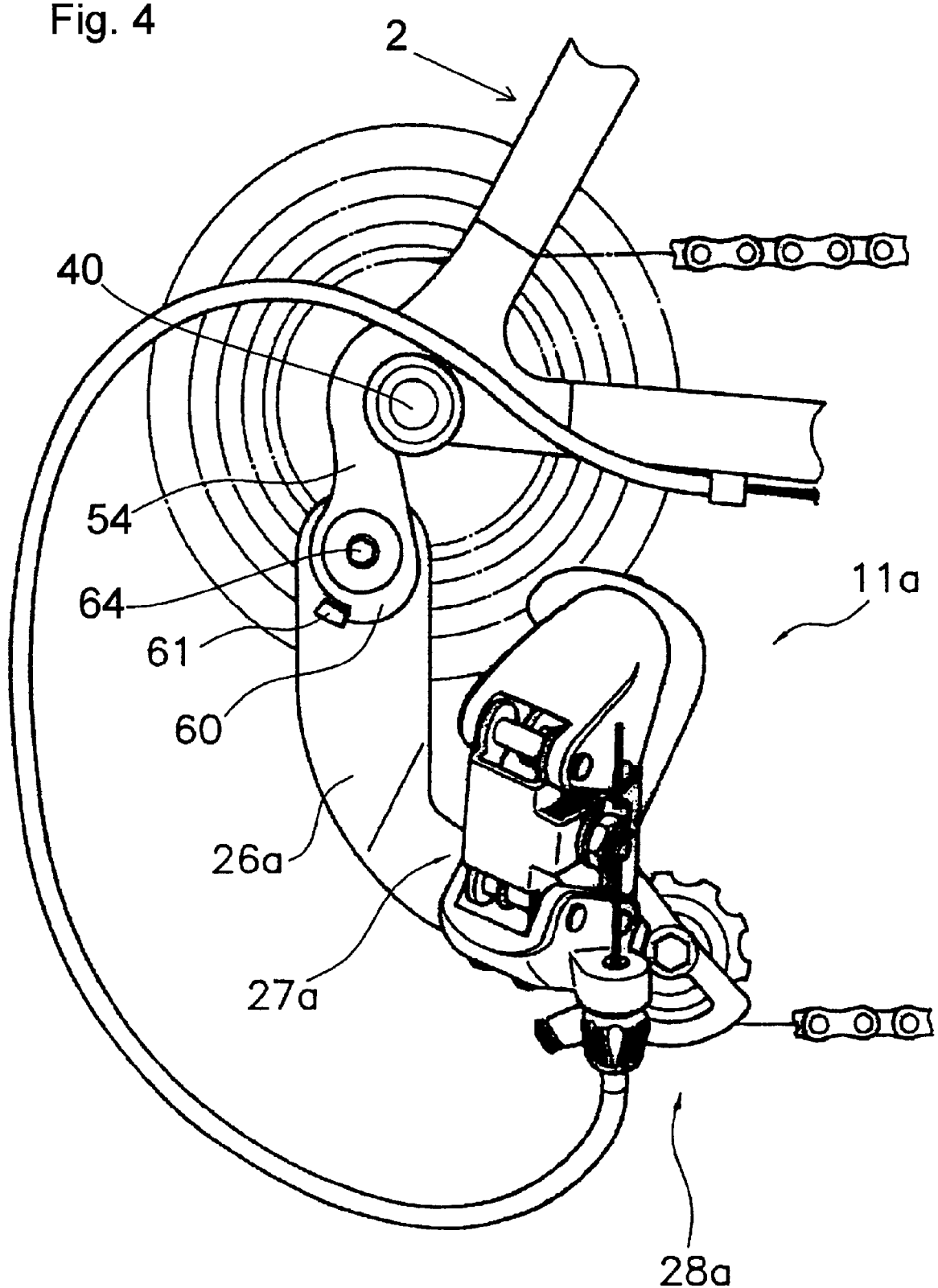
FIG. 4 is a side view of another embodiment of a rear derailleur.

FIG. 4 is a side view of another embodiment of a rear derailleur 11a. Rear derailleur 11a is mounted on the back end of frame body 2, and it comprises a base member 26a, a four-point link mechanism 27a disposed on base member 26a, and a chain guide 28a disposed on the four-point link mechanism 27a. In this second embodiment, the elements other than the base member 26a are identical to those in the preceding embodiment, so they will not be described here.

Figure 5:
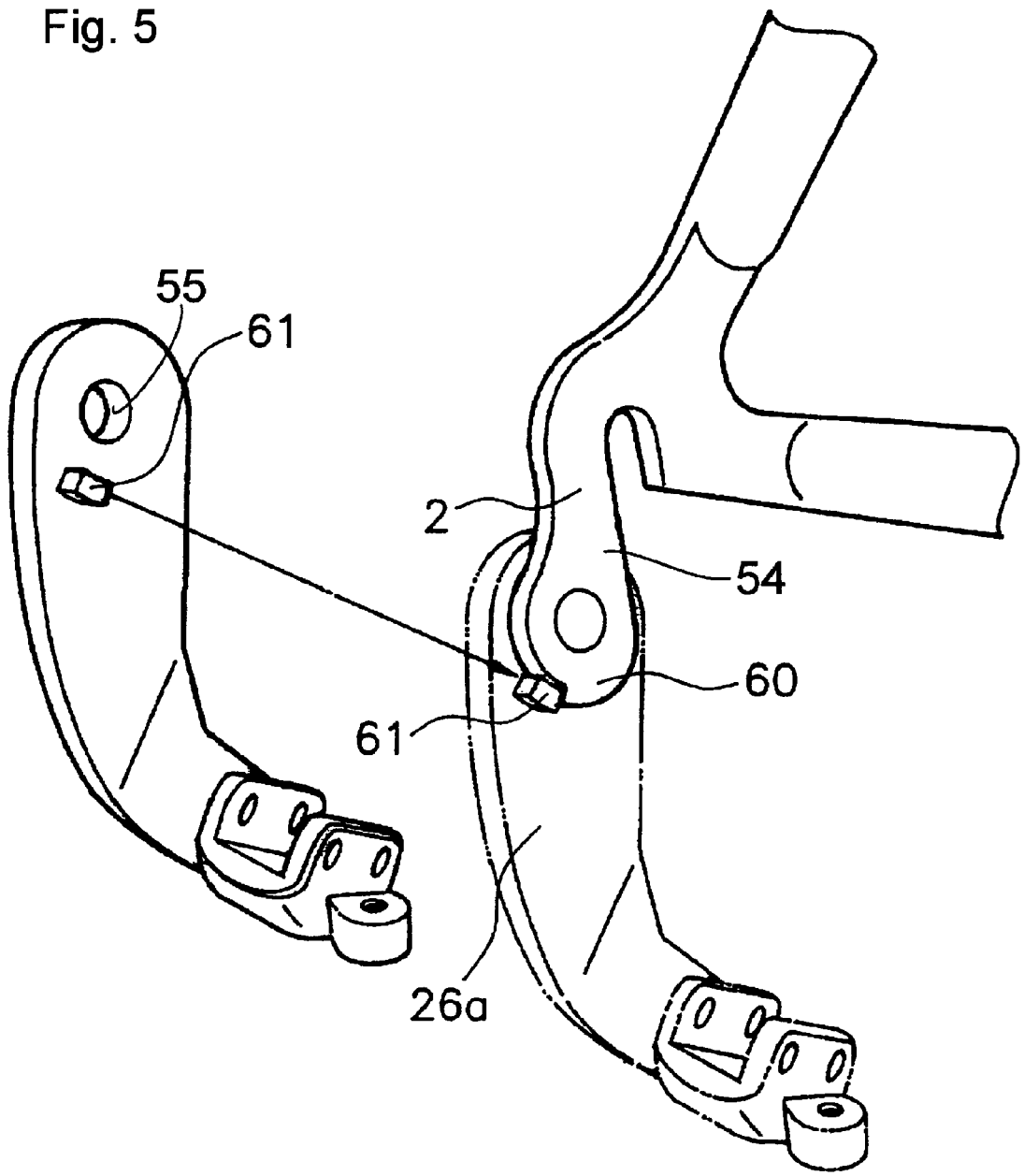
FIG. 5 shows how the base member of the derailleur shown in FIG. 4 is attached to the bicycle frame.

As shown in FIGS. 4 and 5, base member 26a is fastened to the back end of frame body 2 independently of hub axle 40. More specifically, the back end of the frame body 2 that mates with the hub axle 40 projects downwardly to form a derailleur support member 54 with a fastener opening 55. The upper portion of base member 26a includes a fastener opening 58 and a projection 61, wherein projection 61 mates with a notch 60 formed in the lower edge of the derailleur support member 54. Base member 26a is secured to derailleur support member 54 by a fastener 64.

As noted above, in order for the complex functions of rear derailleur 11a to be advantageously realized in a small-wheeled bicycle, it is necessary to avoid contact between derailleur 11a and the road surface while maintaining a highly rigid linkage between the rear derailleur 11a and frame body 2, not only when the bicycle is stopped, but also when the bicycle body is inclined during riding. Since the portion of the four-point link mechanism 27a to which the chain guide 28a and the linking member 39a are mounted is positioned above the portion of the four-point link mechanism 27a mounted to the base member 26a, the chain guide 28a is disposed forward and upwardly of the base member. Thus, the rear derailleur 11a is located further above the road surface than conventional derailleurs, so there is sufficient distance to avoid contact between the rear derailleur 11a and the road surface even if the bicycle body inclines. Additionally, the notch portion 60 formed on the lower edge of the derailleur support member 54 and the projection 61 formed on base member 26a are fastened together in a separate arrangement from the hub axle, thus making it easy to remove and replace the rear derailleur 11a.

While the above is a description of various embodiments of inventive features, further modifications may be employed without departing from the spirit and scope of the present invention. For example, the four-point link mechanisms 27 and 27a in the above embodiments were described as being mounted facing upwardly from the bottom end of the base members 26 and 26a, respectively. However, placement of a four-point link mechanism is not limited to those positions, and the four-point link mechanism may be situated in any location allowing it to be arranged upwardly.

In the first embodiment described above, a convex projection 50 on the upper portion of base member 26 is mated with a concave slit 51 provided at the back end of frame body 2. However, the connecting structure for the frame body and the base member may take any form, provided that the rear derailleur can be non-rotatably secured to the frame body without chatter.

In the second embodiment described above, a projection 61 projecting from base member 26a is mated with a notch 60 formed in a derailleur support member 54. However, the connecting structure for the frame body and the base member may take any form, provided that the rear derailleur can be non-rotatably detained and easily removed from and reattached to the frame body.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature that is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

The invention claimed is:

1. A bicycle derailleur comprising:
   a downwardly extending base member structured to be nonrotatably mounted to a bicycle frame;
   a link base;
   a link mechanism having a first portion and a second portion, wherein the first portion of the link mechanism is coupled to the link base through a first pivot shaft, and wherein the second portion of the link mechanism is disposed above the first portion of the link mechanism; and
   a chain guide coupled to the second portion of the link mechanism so that the chain guide moves relative to the base member to move a chain laterally inwardly toward and laterally outwardly away from a plurality of sprockets;
   wherein the link base extends laterally outwardly away from a lower end portion of the base member so that the link base extends laterally outwardly away from the plurality of sprockets when the base member is mounted to the bicycle frame.

2. The derailleur according to claim 1 wherein the base member is structured to be mounted to the bicycle frame integrally with a wheel axle that supports a plurality of sprockets with which the derailleur cooperates.

3. The derailleur according to claim 2 wherein the base member includes an opening for receiving the wheel axle therethrough.

4. The derailleur according to claim 2 wherein the base member includes a projection structured to engage the bicycle frame to nonrotatably fix the base member to the bicycle frame.

5. The derailleur according to claim 4 wherein the projection is structured to engage a notch formed in the bicycle frame.

6. The derailleur according to claim 4 wherein the projection is structured to engage an opening formed in the bicycle frame.

7. The derailleur according to claim 6 wherein the projection is shaped to engage a slit formed in the bicycle frame.

8. The derailleur according to claim 1 wherein the base member is structured to be mounted to the bicycle frame independently of a wheel axle that supports a plurality of sprockets with which the derailleur cooperates.

9. The derailleur according to claim 8 wherein the base member includes a projection structured to engage the bicycle frame to nonrotatably fix the base member to the bicycle frame.

10. The derailleur according to claim 9 wherein the projection is structured to engage a notch formed in the bicycle frame.

11. The derailleur according to claim 1 wherein the link mechanism comprises a four-point link mechanism.

12. The derailleur according to claim 11 wherein the link mechanism comprises:
    a first link member having a first end and a second end, wherein the first end of the first link member is rotatably coupled to the base member; and
    a second link member having a first end and a second end, wherein the first end of the second link member is rotatably coupled to the base member.

13. The derailleur according to claim 12 wherein the first end of the first link member is coupled to the link base through the first pivot shaft, wherein the first end of the second link member is coupled to the link base through a second pivot shaft, and wherein the first pivot shaft is substantially parallel to the second pivot shaft.

14. The derailleur according to claim 13 wherein the chain guide is rotatably coupled to the second end of the first link member and to the second end of the second link member.

15. The derailleur according to claim 14 further comprising:
    a first biasing mechanism biasing the first link member and the second link member in a rotational direction; and
    a cable retaining unit disposed on at least one of the first link member and the second link member for retaining the end of an operating cable.

16. The derailleur according to claim 15 wherein the link mechanism forms a parallelogram in a plane perpendicular to the first and second pivot shafts such that, as the derailleur moves from the initial state toward the end of its range of motion, the parallelogram transforms into a rectangle and then back into a parallelogram.

17. The derailleur according to claim 16 further comprising:
    a linking member linked to the second ends of the first and second link members; and
    wherein the chain guide comprises:
        a guide frame rotatably mounted to the linking member;
        a pair of guide sprockets rotatably mounted within the guide frame; and
        a second biasing mechanism biasing the guide frame relative to the linking member in a rotational direction.

18. A bicycle derailleur comprising:
    a base member structured to be nonrotatably mounted to a bicycle frame to extend downwardly, wherein the base member includes an outer cable sheath stopper;
    a link mechanism having a first portion and a second portion, wherein the first portion of the link mechanism is coupled to the base member;
    a chain guide coupled to the second portion of the link mechanism so that the chain guide moves relative to the base member to move a chain among a plurality of sprockets; and
    a cable retaining unit disposed on the link mechanism for retaining an inner cable of a control cable assembly;
    wherein the outer cable sheath stopper is oriented so that the inner cable extends upwardly at a location where the inner cable exits the outer cable sheath stopper when the base member is mounted to the bicycle frame;
    wherein the derailleur is operated by pulling downwardly on the cable retaining unit.

19. The derailleur according to claim 1 further comprising an outer cable sheath stopper disposed below the first pivot shaft.

20. A bicycle derailleur comprising:
    a downwardly extending base member structured to be nonrotatably mounted to a bicycle frame;
    a link base;
    a link mechanism having a first portion and a second portion, wherein the first portion of the link mechanism is coupled to the link base, and wherein the second portion of the link mechanism is disposed above the first portion of the link mechanism; and a chain guide coupled to the second portion of the link mechanism so that the chain guide moves relative to the base member to move a chain laterally inwardly toward and laterally outwardly away from a plurality of sprockets;

wherein the link base extends laterally outwardly away from a lower end portion of the base member so that the link base extends laterally outwardly away from the plurality of sprockets when the base member is mounted to the bicycle frame; and wherein the chain guide supports a lower guide sprocket for rotation around a rotational axis, wherein the rotational axis of the lower guide sprocket is located above a lowermost surface of the base member.

* * * * *